United States Patent [19]
Riel

[11] 3,855,044
[45] Dec. 17, 1974

[54] CORROSION RESISTANT ADHESIVE BONDING SYSTEM

[75] Inventor: Frank J. Riel, San Diego, Calif.

[73] Assignee: Rohr Industries, Inc., Chula Vista, Calif.

[22] Filed: Aug. 6, 1973

[21] Appl. No.: 386,040

[52] U.S. Cl............... 161/89, 9/6, 106/14, 114/122, 156/330, 161/144, 161/162, 161/167, 161/186, 161/213, 244/123, 260/37 EP

[51] Int. Cl.............. B32b 15/02, B32b 15/08

[58] Field of Search............ 161/47, 55, 95, 96, 98, 161/184, 186, 227; 106/14; 260/37 EP, 37 M; 244/123, 133; 156/330, 155; 114/122

[56] References Cited
UNITED STATES PATENTS

| | | | |
|---|---|---|---|
| 2,836,529 | 5/1958 | Morris | 161/95 X |
| 3,256,135 | 6/1966 | Weinheimer | 161/186 X |
| 3,304,344 | 2/1967 | Szawiowski | 260/37 EP X |
| 3,464,854 | 9/1969 | Bolger | 260/37 EP X |
| 3,470,110 | 9/1969 | Szawlowski | 260/37 EP X |
| 3,470,266 | 9/1969 | Betzer et al. | 260/37 EP X |
| 3,663,354 | 5/1972 | Ueno | 161/186 |
| 3,674,585 | 7/1972 | Windecker | 156/330 X |
| 3,703,434 | 11/1972 | Schaof | 161/186 X |
| 3,707,583 | 12/1972 | McKown | 156/330 UX |
| 3,748,292 | 7/1973 | Stander | 260/37 EP X |

Primary Examiner—George F. Lesmes
Assistant Examiner—Alan T. McDonald
Attorney, Agent, or Firm—Patrick J. Schlesinger; Jay D. Gordon

[57] ABSTRACT

An epoxy resin adhesive used in the bonding of metallic aircraft elements is reinforced with anodic material to provide the adhesive system with corrosion resistance. Where the adhesive system contains fiber reinforcement, such as glass or nylon, individual wires are inserted in the adhesive system, which wires have a tendency to disintegrate in a corrosive environment faster than will the interface between the metal and the adhesive. Where the adhesive system is unreinforced, an open mesh weave of metallic material is embedded in the adhesive system. The open mesh weave disintegrates much in the same manner as the individual wires, both systems tending to inhibit disintegration of the metal-adhesive interface.

3 Claims, 5 Drawing Figures

PATENTED DEC 17 1974　　　　　　3,855,044

CORROSION RESISTANT ADHESIVE BONDING SYSTEM

BACKGROUND OF THE INVENTION

The present invention relates to a corrosion resistant bonding system which is designed to inhibit corrosion at a metal adhesive interface.

Modern aircraft technology utilizes epoxy resin adhesives to bond two metallic elements together. Bonds of this nature have proven to be structually adequate in high stress aircraft applications. Over a period of time, the metal-adhesive interface disintegrates in a corrosive environment. This produces the intolerable situation where the metal delaminates from the adhesive, which causes complete failure of the bond.

It has been found that where the adhesive contains anodic material, which material tends to disintegrate at a faster rate than the metal (generally aluminum), the corrosion is inhibited by the disintegration of the anodic material. The use of either the discrete metallic wires or the open mesh weave, provides sufficient protection against disintegration of the aluminum-adhesive interface so that the structural security of the aircraft is enhanced.

Aluminum is a reactive metal, and is subject to deterioration in many environments. It is apparent inertness is based on its ability to react with oxygen to form a dense, impervious, oxide coating which protects the base metal from further degredation. Any exposure, either chemical or mechanical, which removes this coating and exposes the base metal, will lead to corrosion unless the environment is such that a new protective coating can be formed.

Typical chemical reactions forming oxide coatings are:

$$4Al + 3O_2 \rightarrow 2Al_2O_3$$

$$4Al + 3O_2 + 6H_2O \rightarrow 4Al(OH)_3$$

$$4Al + 6H_3CrO_4 + 9H_2SO_4 \rightarrow 4Al(OH)_3 + 3Cr_2(SO_4)_3 + 12H_2O$$

The actual coatings formed are not as simple as shown above, but are complex compounds of oxide and hydroxide, with different crystal forms possible.

Aluminum, being amphoteric, reacts with acids and bases and therefore is unstable since either environment will dissolve the coating and oxidize the base metal.

EXAMPLES $$2Al + 6H^+ \rightarrow 2Al^{+++} + 3H_2$$

$$2Al + 6OH^- \rightarrow 2AlO_3^{---} + 3H_2$$

$$Al(OH)_3 + 3H^+ \rightarrow Al^{+++} + 3H_2O$$

$$Al(OH)_3 + OH^- \rightarrow Al(OH)_4^-$$

When aluminum corrodes, the reactions involved are electrochemical in nature, and the driving force is a potential difference between two areas, resulting from different compositions, or concentrations of active metals. In order to have galvanic corrosion certain conditions must be satisfied; there must be an anode or an electrode, where an oxidation reaction, involving loss of electrons occurs. The cathode picks up these electrons and is generally corrosion free, although in some cases secondary reactions may occur. A particular electrochemical environment may be supportive of chemical reactions which will produce corrosion. For instance, the most common reaction involves atmospheric oxygen, as the cathode and the base metal (aluminum) as the anode.

$$Al \rightarrow Al^{+++} + 3e \text{ (anode reaction)}$$

$$O_2 + 2H_2O + 4e \rightarrow 4OH^- \text{ (cathode reaction)}$$

The secondary reactions are:

$$Al^{+++} + 3H_2O \rightarrow Al(OH)_3 + 3H^+$$

$$6H^+ + 2Al \rightarrow 2Al^{+++} + 3H_2$$

These equations reveal that the aluminum ion produced by the initial oxidation reacts with the water present producing a localized acidic area. As the acid concentration builds up, the acid generated penetrates the oxide coating, and attacks the base metal, producing more corrosion which can eventually penetrate the entire aluminum-adhesive interface. Thus, it is seen that the primary corrosion mechanism in this environment is the development of anoidc and cathodic areas along the aluminum adhesive interface which are caused by a difference in electrochemical potential. The protective oxide film, which is only one millionth of an inch thick can be broken which will result in corrosion initiation. Once the process has begun its propagation is relatively rapid. Electrochemical action encourages anodic corrosion.

The prior art teaches several techniques of inhibiting corrosion. One such technique is to prevent moisture from contacting the adhesive-metal interface by minimizing the amount of exposed edge by proper joint design. Additionally, rivet and bolt attachment holes are avoided where possible, and where necessary are protected from moisture with a sealant. Another technique is to squeeze out the surplus adhesive which seals the edges. Various surface treatments are utilized which are intended to electrically insulate the interface area preventing electron exchange. Unfortunately, those treatments which are most effective as corrosion barriers frequently exhibit poor bonding characteristics. For aluminum alloys, anodized treatments which provide excellent corrosion resistance do not produce coatings suitable for adhesive bonding. Corrosion inhibiting primers, which are suspensions or solutions of various chromates in an organic resin, sometimes are applied to the metal surface prior to bonding. The oxidizing power of these materials re-establishes the oxide film on the metal surface, in the event it tends to deteriorate in a corrosive environment.

The instant invention is directed to providing a solution to the nagging problem of aluminum-adhesive interface corrosion. The inclusion in the adhesive of anodic material such as zinc or high potential aluminum alloys (which has greater electrochemical activity) effectively insulates the interface from corrosion in that the anodic material is more reactive in the corrosive environment and corrodes before the aluminum at the adhesive-metal interface does.

The above and other aspects of the present invention will be apparent as the description continues, and when read in conjunction with the appended drawings

DETAILED DESCRIPTION

Figure 2:
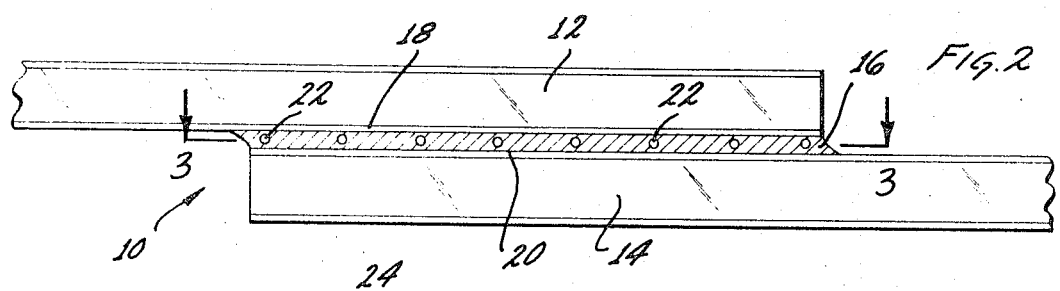
FIG. 2 is a side elevational view illustrating an embodiment of the instant invention wherein the adhesive system is unreinforced by fibers but includes an open mesh weave of anodic material.

According to FIG. 2, there is shown a joint 10 of the overlap type which bonds the sheets 12 and 14 which may be fabricated of clad or bare aluminum alloy. As has been discussed, the cladding has a tendency to corrode over a period of time causing the delamination of sheets 12 and 14 from the adhesive bonding material 16. The sheets 12, 14 are preferably clad 18, 20 with an aluminum alloy specially selected to be anodic with respect to the core material 12 and 14. As stated in other parts of this specification, there is a tendency, over a period of time, for the cladding 18, 20 to corrode and delaminate from the adhesive 16. If bare alloys are used, built in surface stresses accelerate corrosion. To protect this joint system from such corrosion sacraficial anodic material in the form of individual wires 22 of material such as zinc or aluminum is dispersed within the adhesive matrix 16. Over an appropriate period, the anodic material 22 corrodes and is sacrificed in favor of maintaining the integrity of the joint 10. It has been found that while the anodic material 22 has a predetermined life span, that span is long enough to provide adequate protection during the life of the primary structure which incorporates the joint 10.

Figure 3:
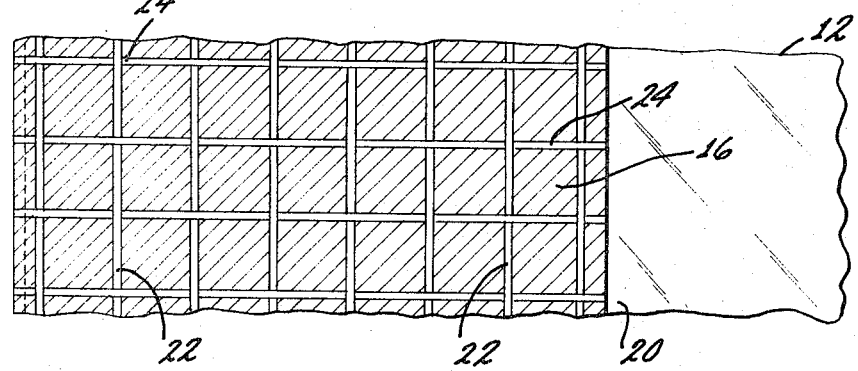
FIG. 3 is a cross sectional view of the embodiment of FIG. 2 taken along the line 3—3.

In FIG. 3 the joint 10 which embodies the idea of using anodic material comprises an unreinforced adhesive matrix 16. To provide the joint with greater structural characteristics, the anodic material may be disposed in a mesh weave 24. This embodiment consists of a grid-work pattern and reinforces the adhesive as well as protects the joint against corrosion.

Figure 1:
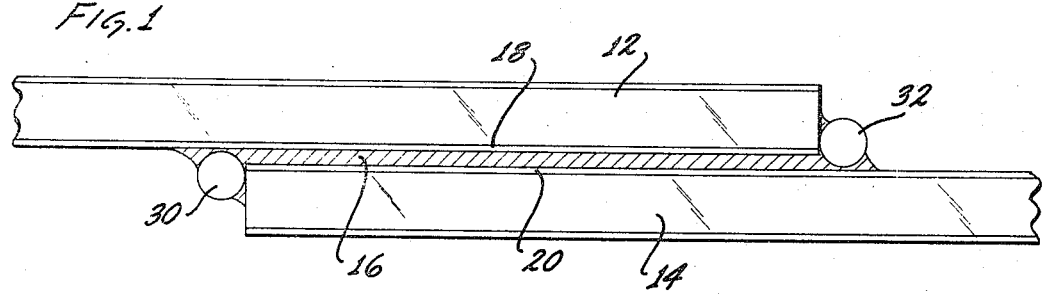
FIG. 1 is a side elevational view illustrating an embodiment of the instant invention wherein the anodic material is disposed within the adhesive but at the exterior terminus of the joints.
Figure 4:
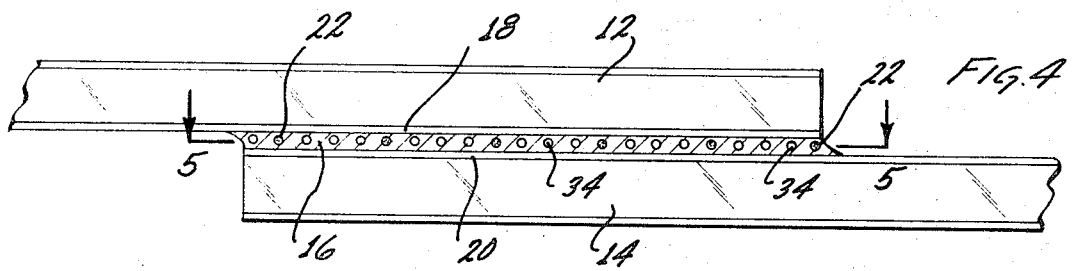
FIG. 4 is a side elevational view illustrating a fiber reinforced adhesive joint which includes a discrete lengths of anodic material.
Figure 5:
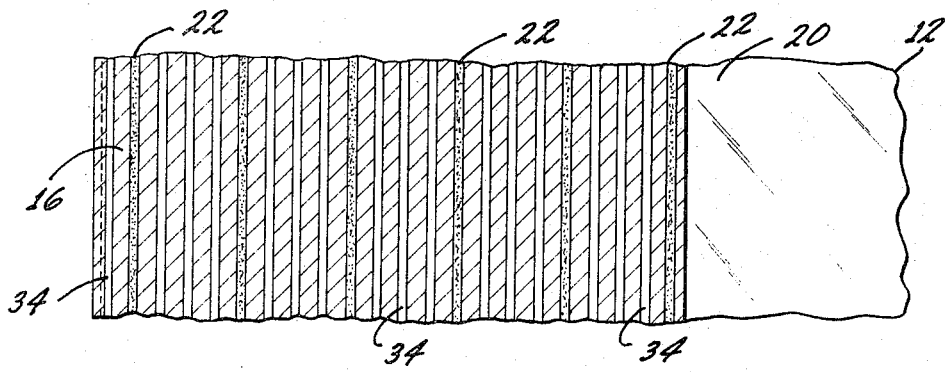
FIG. 5 is a cross sectional view, taken along the line 5—5 of FIG. 4.

FIG. 1 illustrates the utilization of anodic material in rather substantial wires 30, 32 which are disposed at the exterior terminus of the joint 16. In FIGS. 4 and 5 the anodic material is used in conjunction with fiber reinforcement 24 (such as glass or nylon).

In all the embodiments herein described, the use of the anodic material materially affects the structural characteristics of the joint. The disintegration of the joint is retarded and its life is materially lengthened.

Many changes may be made in details of the instant invention, in the method and materials of fabrication, in the configuration and assemblage of the constituent elements, without departing from the spirit and scope of the appended claims, which changes are intended to be embraced therewithin:

I claim:

1. A corrosion resistant joint for joining at least two structural metal parts, comprising metal to adhesive interfaces, wherein said adhesive comprises an epoxy resin containing a metal reducing agent interspersed within the body of said adhesive said reducing agent comprising a metal higher on the electronegativity scale then the metals being bonded, said reducing agent being a sacrificial material whereby said material substantially corrodes prior to the metals along the interfaces thereof corroding.

2. The joint of claim 1 wherein said reducing agent comprises an open mesh metal weave.

3. The joint of claim 1 wherein said reducing agent is located within the adhesive at the exterior terminus of the joints.

* * * * *